(12) United States Patent
Taki

(10) Patent No.: US 12,060,074 B2
(45) Date of Patent: Aug. 13, 2024

(54) SYSTEM AND METHOD FOR ADJUSTING EXTERNAL POSITION INFORMATION OF A VEHICLE

(71) Applicant: TOYOTA MOTOR EUROPE, Brussels (BE)

(72) Inventor: Naoki Taki, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 731 days.

(21) Appl. No.: 17/043,423

(22) PCT Filed: Mar. 30, 2018

(86) PCT No.: PCT/EP2018/058283
§ 371 (c)(1),
(2) Date: Sep. 29, 2020

(87) PCT Pub. No.: WO2019/185165
PCT Pub. Date: Oct. 3, 2019

(65) Prior Publication Data
US 2021/0016794 A1   Jan. 21, 2021

(51) Int. Cl.
*B60W 60/00* (2020.01)
*B60W 30/18* (2012.01)
*B60W 50/06* (2006.01)

(52) U.S. Cl.
CPC .... *B60W 60/001* (2020.02); *B60W 30/18163* (2013.01); *B60W 50/06* (2013.01);
(Continued)

(58) Field of Classification Search
USPC .......................................................... 701/26
See application file for complete search history.

(56) References Cited

U.S. PATENT DOCUMENTS 8,447,519 B2 * 5/2013 Basnayake .............. G01S 19/40
701/445
8,630,461 B2 * 1/2014 Miyajima .......... G01C 21/3647
382/104
(Continued)

FOREIGN PATENT DOCUMENTS

CA   2 990 775 A1   12/2016
CN   106767853 A   5/2017
(Continued)

OTHER PUBLICATIONS

International Search Report for PCT/EP2018/058283 dated Mar. 22, 2019 (PCT/ISA/210).
(Continued)

*Primary Examiner* — Jonathan M Dager
(74) *Attorney, Agent, or Firm* — Sughrue Mion, PLLC

(57) ABSTRACT

A system for adjusting external position information of a vehicle driving on a road, including a sensor configured to sense a predetermined static lane object of the road, the vehicle driving on the road, and an electronic control device configured to:
  receive external position information indicating the vehicle position, detect the static lane object based on a sensor output received from the sensor,
  determine the position of the static lane object with regard to the vehicle position based on the received sensor output, and
  adjust the external vehicle position information by calibrating the vehicle position with regard to the determined position of the static lane object.

15 Claims, 2 Drawing Sheets

(52) U.S. Cl.
CPC ... *B60W 2420/403* (2013.01); *B60W 2552/53* (2020.02); *B60W 2554/20* (2020.02); *B60W 2554/80* (2020.02)

(56) References Cited

U.S. PATENT DOCUMENTS

| | | | |
|---|---|---|---|
| 9,208,389 B2* | 12/2015 | Sung | G01S 19/485 |
| 9,587,948 B2* | 3/2017 | Schuller | G05D 1/0274 |
| 9,631,943 B2* | 4/2017 | Shashua | G01C 21/14 |
| 9,719,801 B1* | 8/2017 | Ferguson | G01S 17/87 |
| 9,767,372 B2* | 9/2017 | Yamanoi | G06V 10/98 |
| 9,884,623 B2* | 2/2018 | Fasola | G06V 20/647 |
| 9,933,515 B2* | 4/2018 | Prokhorov | G01S 7/4972 |
| 9,939,813 B2* | 4/2018 | Shashua | H04W 4/44 |
| 10,145,692 B2* | 12/2018 | Okuyama | G08G 1/0969 |
| 10,260,889 B2* | 4/2019 | Yamaguchi | G01C 21/30 |
| 10,365,363 B2* | 7/2019 | Rohr | G01C 21/12 |
| 10,459,089 B2* | 10/2019 | Van Diggelen | G01S 5/015 |
| 10,534,370 B2* | 1/2020 | Cavalcanti | G08G 1/091 |
| 10,788,327 B2* | 9/2020 | Hawkins | G01C 21/16 |
| 10,890,453 B2* | 1/2021 | Tateishi | G06F 16/29 |
| 10,921,461 B2* | 2/2021 | Tan | G01S 19/49 |
| 11,112,252 B2* | 9/2021 | Gokhale | G01S 17/86 |
| 11,125,575 B2* | 9/2021 | Xu | G01S 5/16 |
| 11,153,708 B2* | 10/2021 | Smith | H01Q 25/005 |
| 11,255,974 B2* | 2/2022 | Choi | G01S 13/89 |
| 11,514,681 B2* | 11/2022 | Kaku | B60W 50/0205 |
| 11,541,910 B1* | 1/2023 | Ganguli | B60W 30/18163 |
| 11,623,664 B1* | 4/2023 | Ganguli | B60Q 5/006 701/26 |
| 2008/0319657 A1* | 12/2008 | Gao | G01C 21/30 701/532 |
| 2009/0228204 A1* | 9/2009 | Zavoli | G01C 21/30 701/532 |
| 2010/0061591 A1* | 3/2010 | Okada | G08G 1/167 382/103 |
| 2011/0161032 A1* | 6/2011 | Stahlin | G01C 21/30 702/94 |
| 2013/0274959 A1* | 10/2013 | Igarashi | G08G 1/096861 701/1 |
| 2014/0358322 A1* | 12/2014 | Ibrahim | G05D 1/0055 701/1 |
| 2014/0379254 A1* | 12/2014 | Miksa | G01C 21/30 701/450 |
| 2015/0081211 A1* | 3/2015 | Zeng | G01S 19/42 701/446 |
| 2015/0185735 A1* | 7/2015 | Liang | G06V 20/56 701/523 |
| 2015/0345974 A1* | 12/2015 | Takahashi | G01C 21/3602 701/461 |
| 2016/0069985 A1* | 3/2016 | Kwakkernaat | G08G 1/04 342/146 |
| 2016/0097644 A1 | 4/2016 | Strassenburg-Kleciak | |
| 2016/0116289 A1* | 4/2016 | Friend | G01S 19/393 701/518 |
| 2016/0363647 A1* | 12/2016 | Zeng | G06V 20/582 |
| 2017/0023659 A1* | 1/2017 | Bruemmer | G01S 5/0278 |
| 2017/0038477 A1* | 2/2017 | Schmid | G01S 19/51 |
| 2017/0075355 A1* | 3/2017 | Micks | G05D 1/0274 |
| 2017/0167883 A1* | 6/2017 | Pink | G01C 21/30 |
| 2017/0291603 A1* | 10/2017 | Nakamura | B60W 30/18163 |
| 2017/0329332 A1* | 11/2017 | Pilarski | B60W 30/0956 |
| 2017/0350712 A1* | 12/2017 | Tateishi | G01C 21/3602 |
| 2018/0045516 A1* | 2/2018 | Sumizawa | G01C 21/005 |
| 2018/0045519 A1* | 2/2018 | Ghadiok | G06F 16/2379 |
| 2018/0087907 A1* | 3/2018 | DeBitetto | G01S 19/48 |
| 2018/0204347 A1* | 7/2018 | Stenborg | G06F 18/22 |
| 2018/0307917 A1* | 10/2018 | Mittal | G05D 1/0246 |
| 2018/0328741 A1* | 11/2018 | Pratt | G06V 20/588 |
| 2018/0341273 A1* | 11/2018 | Micks | G05D 1/0274 |
| 2019/0086928 A1* | 3/2019 | Chen | G01C 21/3492 |
| 2019/0163197 A1* | 5/2019 | Qiao | G06V 20/582 |
| 2019/0294898 A1* | 9/2019 | Jin | G08G 1/0116 |
| 2020/0070859 A1* | 3/2020 | Green | B61L 25/025 |
| 2022/0066051 A1* | 3/2022 | Hirohata | G01S 13/86 |

FOREIGN PATENT DOCUMENTS

| | | |
|---|---|---|
| EP | 1 975 563 A2 | 10/2008 |
| EP | 1 975 563 A3 | 10/2008 |
| EP | 2 824 416 A1 | 1/2015 |
| WO | 2013/117940 A2 | 8/2013 |
| WO | 2013/117940 A3 | 8/2013 |

OTHER PUBLICATIONS

Written Opinion for PCT/EP2018/058283 dated Mar. 22, 2019 (PCT/ISA/237).

* cited by examiner

SYSTEM AND METHOD FOR ADJUSTING EXTERNAL POSITION INFORMATION OF A VEHICLE

CROSS REFERENCE TO RELATED APPLICATIONS

This application is a National Stage of International Application No. PCT/EP2018/058283 filed Mar. 30, 2018.

FIELD OF THE DISCLOSURE

The present disclosure is related to a system and method for adjusting external position information of a vehicle, in particular to an enhanced localization technique where position information of a vehicle received from an external source can be adjusted, i.e. corrected or refined. The adjustment technique may in particular be useful for automated driving systems, which require a precise and reliable position information.

An automated driving system is a motor vehicle driving automation system that is capable of performing part or all of the dynamic driving task (DDT) on a sustained basis. An automated driving system may be mounted or is to be mounted in a vehicle (such as a car, a truck, an airplane).

In the case of road vehicles in particular, it may range in level from no driving automation (level 0) to full driving automation (level 5) according to SAE norm J3016.

In order to realize this function, an automated driving system normally comprises at least one sensor, an electronic control unit, and feedback devices which transmit information to the driver and/or act on control member(s) of the vehicle (for instance the steering shaft, the brake, the accelerator pedal or the like) instead of the driver to take some driving load off the driver.

An automated driving system is at least capable of assuming part of the driving task (for instance, to perform longitudinal control of the vehicle). In particular, many automated driving systems are designed to assist the driver and are therefore called Advanced Driver Assistance Systems (ADAS). Some automated driving systems are capable of assuming the whole driving task, at least during some periods. Such systems are classified at level 3, 4 or 5 according to SAE norm J3016.

The present disclosure may concer an automated driving system classified desirably at level 3 or more according to SAE norm J3016.

BACKGROUND OF THE DISCLOSURE

Automated driving systems require position information of the vehicle, in order to navigate. This position information may include a "global position", i.e. a geo position information (e.g. a GPS signal), in order to localize the vehicle on a specific map position and to navigate the vehicle to a pre-selected destination. In other words, said global position information is external position information, i.e. which has been determined by using external position means (i.e. an external source), e.g. navigation satellites. The position information may additionally or alternatively include a "micro position", i.e. position information of the vehicle with regard to its detected environment (i.e. surrounding area). For example, the vehicle may comprise an object detection sensor (e.g. one or several cameras), wherein external objects (e.g. the road/lane on which the vehicle is moving and/or other vehicles) are detected.

However, there may occur the problem that especially the external global position information (i.e. received from an external source) can be not satisfactorily precise for a reliable automated navigation of the vehicle.

In order to compensate this problem, it is possible to use highly precise HD maps. However, these maps imply high costs (computing costs and economical costs). Further, if once a deviation has occurred between the vehicle's determined position and its actual position, recovery is very difficult. Accordingly, using highly precise HD maps is no permanent solution, e.g. over a long driving distance.

A further possibility to compensate this problem is to calibrate the external position information by taking the position of detected road signs as a reference. In case the road sign has been placed at a predetermined position, said position can be detected by the automated driving system and be used as a reference, in order to calibrate the external position information. However, such a calibration technique depends on the criteria, that the road sign has been correctly placed at the predetermined position. Further, the fact that road signs have various shapes and/or sizes may have a negative impact on this calibration technique. Moreover, especially rural areas, some roads (e.g. highways) have only few road signs.

Still a further possibility to compensate this problem is to calibrate the external position information by taking into account the position of a dedicated localization sign. Such a sign may have a similar appearance to a regular road sign. Its purpose is however to indicate a predetermined position, in particular to an automated driving system which is configured to detect that sign by using an object detection sensor. However, such a calibration technique implies high installation costs and an increased installation time, as each road would need to be equipped with such dedicated localization signs in a minimum interval.

SUMMARY OF THE DISCLOSURE

Currently, it remains desirable to provide a system and a method for adjusting external position information of a vehicle in a reliable and economical manner.

Therefore, according to the embodiments of the present disclosure, a system for adjusting external position information of a vehicle is provided. The system comprises:
a sensor configured to sense a predetermined static lane object of the road, the vehicle driving on said road,
an electronic control device configured to:
   receive external position information indicating the vehicle position,
   detect the static lane object based on a sensor output received from the sensor,
   determine the position of the static lane object with regard to the vehicle position based on the received sensor output, and
   adjust the external vehicle position information by calibrating the vehicle position with regard to the determined position of the static lane object.

By providing such a control device, it becomes possible to adjust (i.e. refine or correct) the external position information (i.e. a position information received from an external source) and thereby to determine the precise actual position of the vehicle. This can be achieved by detecting static lane objects of the road which may serve as a reference.

Accordingly, even if the external vehicle position is not fully precise (or fully correct), the precise actual vehicle position can anyhow be reliably determined by taking into account static lane objects as localization references.

Said predetermined static lane object may also be referred to as a predetermined lane section or as a predetermined static lane characteristic, in particular a predetermined static lane characteristic at a spatially limited and/or globally unique section of the road.

Said precise actual position may be used e.g. for a reliable automated driving control of the vehicle.

Receiving an external position information desirably includes: receive a geo position information, receive and/or store map data, and determine the vehicle position based on the geo position information and the map data.

Accordingly, the vehicle position may be determined which can though be unprecise or incorrect (i.e. not fully reliable, in particular for automated driving).

Determining the position of the static lane object desirably comprises: determine the geo position of the detected static lane object in received and/or stored map data.

Accordingly, not only the relative position of the static lane object with regard to the vehicle may be determined but also the (absolute or global) geo position of the static lane object may be determined.

Calibrating the vehicle position desirably comprises: calibrate the geo position of the vehicle with regard to the geo position of the static lane object.

Accordingly, the vehicle position as indicated by the external position information may be calibrated (i.e. corrected or refined) by taking the geo position of the static lane object as a reference.

Accordingly, the precise actual vehicle position may be determined by identifying the precise global position of the static lane object and using this position as a reference.

The road may comprise at least partially at least two lanes in one road direction. For example, due to a road junction area, the road may comprise at least one driving lane and in an area an additional parallel exit lane (or exit ramp).

The static lane object constitutes a predetermined change in the lane characteristics along the road.

A road comprises usually one lane per direction, in case of a highway often two or more lanes per direction. Due to a broadening or narrowing of the road there may be accordingly lane splitting areas and/or lane merging areas. In addition there may be at least in some areas parallel emergency stopping lanes (i.e. shoulders). Furthermore, due to road junctions there may be areas with exit lanes and/or joining lanes.

In other words, there may be different changes in the lane characteristics along the road, i.e. lane sections where the lane characteristics of the road change (i.e. static lane objects as referred to in the present disclosure). These changes may be detected and used as a reference for the calibration.

The static lane object may comprise at least one of: a road junction area (e.g. comprising at least one an exit lane area and/or at least one an joining lane area), an exit lane area of the road, an joining lane area of the road a lane splitting area of the road, a lane merging area of the road, and an emergency stopping lane area of the road (i.e. a (hard) shoulder).

The electronic control device may be further configured to: detect a road sign and/or a dedicated localization sign based on the received sensor output, determine the position of the road sign and/or the dedicated localization sign with regard to the vehicle position based on the received sensor output, adjust the vehicle position information by additionally calibrating the vehicle position to the determined position of the road sign and/or the dedicated localization sign.

Accordingly, the road sign and/or a dedicated localization sign may be used as additional references, i.e. in addition to the static lane object.

The electronic control device may be configured to: detect a predetermined element of the static lane object based on the received sensor output, determine the position of the predetermined element with regard to the vehicle position based on the received sensor output, adjust the vehicle position information by calibrating the vehicle position to the determined position of the predetermined element.

Accordingly, instead of detecting the (complete) static lane object only a predetermined element of the static lane object may be used as a reference. Hence, an easily detectable element may be used which desirably has a predetermined position at the static lane object.

The predetermined element may comprise at least one of: a safety barrier of the static lane object, a gore area indicating the static lane object, and an impact attenuator (i.e. a bollard) placed at a point of separation of an exit lane with regard to the road.

The electronic control device may be configured to: determine a level of visibility and/or a lane change of the vehicle based on the received sensor output, apply a weighting factor to the vehicle position adjustment based on at least one of: the level of visibility, wherein the weighting factor decreases in case of a decreased level of visibility, the distance of the detected static lane object, wherein the weighting factor decreases in case of an increased distance, and a lane change during detection of the static lane object, wherein the weighting factor decreases in case of the lane change.

Accordingly, in case of e.g. a bad visibility and/or a lane change during the detection of a static lane object, the position adjustment may be considered only with a reduced weighting factor or may even be disregarded.

In this way it can be assured that the position adjustment does not lead to a deterioration of the external position information, e.g. due to an incorrect detection because of bad visibility.

Adjusting the external vehicle position information may comprise: initialization of the electronic control device based on a first detected static lane object, and adjusting the vehicle position information by calibrating the vehicle position to determined positions of subsequently detected static lane objects.

Accordingly, a first detected static lane object may be used for initialization, i.e. it may be checked whether adjustment function is implemented and works by calibrating the vehicle position with regard to the determined position of the first static lane object. After initialization a (regular) adjustment may be done using subsequently detected static lane objects. However, not every subsequently detected static lane object is necessarily considered by e.g. only every second detected static lane objects. Hence, the electronic control device may be operable in a more economical way.

The electronic control device may be configured to: when adjusting the vehicle position information, prioritize a detected dedicated localization sign with regard to a detected static lane object and/or a detected road sign.

Accordingly, in case there is the choice, desirably the detected dedicated localization sign is used as a reference, as it is assumed to provide the most reliably position adjustment.

The road may extend in a longitudinal direction and/or the road width is defined by its lateral extension, wherein adjusting the vehicle position information may comprise at least one of: adjusting a relative lateral position information of the vehicle with respect to the road, adjusting a relative longitudinal position information of the vehicle with respect to the road, and adjusting a geo position information of the vehicle.

The system may be an automated driving system configured to autonomously drive the vehicle.

The electronic control device may be further configured to control autonomous driving of the vehicle.

The disclosure may further relate to a vehicle comprising a system as described above.

The disclosure further relates to a transport system comprising:

a system for adjusting external position information as described above, and a calibration system for calibrating the vehicle position.

The calibration system may be configured to be installed at a road comprising at least one predetermined static lane object, wherein the calibration system may comprise at least one predetermined element configured to indicate the static lane object, and the predetermined element may be positioned at a predetermined position at the static lane object. For example, the predetermined element may comprise specific marks covering the static lane objects.

The disclosure further relates to a method of adjusting external position information of a vehicle driving on a road. The method comprises the steps of:

sensing a predetermined static lane object of a road using a sensor, the vehicle driving on said road,
receiving external position information indicating the vehicle position,
detecting the static lane object based on a sensor output received from the sensor,
determining the position of the static lane object with regard to the vehicle position based on the received sensor output, and
adjusting the vehicle position information by calibrating the vehicle position with regard to the determined position of the static lane object.

The method may comprise further method steps which correspond to the functions of the automated driving system, as described above.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
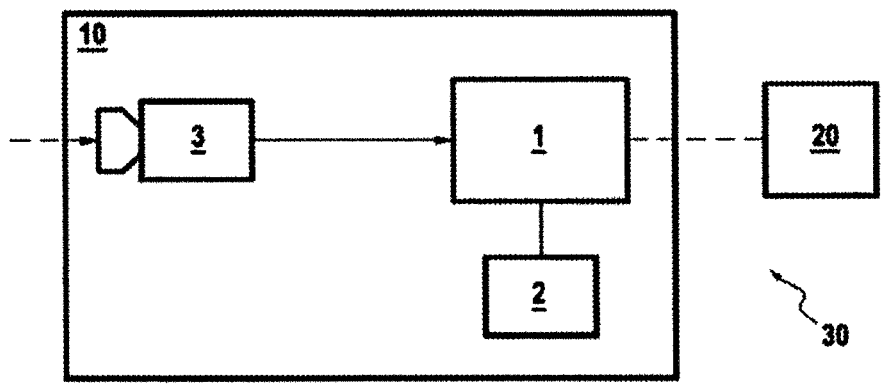
FIG. 1 shows a block diagram of system for adjusting external position information with an electronic control device according to embodiments of the present disclosure.

FIG. 1 shows a block diagram of a system for adjusting external position information with a control device 1 according to embodiments of the present disclosure. The system 10 may be an automated driving system or a part of an automated driving system. The system 10 may be comprised by a vehicle 30.

The control device 1 is connected to or comprises a data storage 2. Said data storage may be used to store a map. As described in the following, said map may be used together with a received a geo position information to determine the position of the vehicle and may be used to determine the geo position of a detected static lane object.

The control device 1 may additionally carry out further functions in the vehicle 30. For example, the control device may also act as the general purpose ECU (electronic control unit) of the vehicle. The control device 1 may comprise an electronic circuit, a processor (shared, dedicated, or group), a combinational logic circuit, a memory that executes one or more software programs, and/or other suitable components that provide the described functionality.

The system 10, in particular the control device 1 may be connected in a wireless manner to an external information source 20. Said external information source 20 may comprise a satellite navigation system and/or a map system. Accordingly, the system 10 may receive external position information and/or map data from the information source 20.

The control device 1 is further connected to a sensor 3, in particular an optical sensor, e.g. a digital camera. The digital camera 3 is configured such that it can sense a driving scene, i.e. in particular the road on which the vehicle is driving. The digital camera is desirably oriented toward the principle driving direction of the vehicle, i.e. such that it senses the lane on which the vehicle is driving including the left and right periphery of the lane. It is also possible to use several cameras 3. Accordingly, it may also be reasonable to use several sensors (e.g. cameras), in order to sense the complete surrounding of the vehicle, including sensing the left and right sides of the vehicle and/or the back of the vehicle.

The output of the digital camera 3, in particular single images recorded at a predetermined sampling frequency (e.g. 10 Hz), is transmitted to the control device 1. Desirably, the output is transmitted instantaneously, i.e. in real time or in quasi real time. Hence, a static lane object may also be detected by the control device in real time or in quasi real time.

Figure 2:
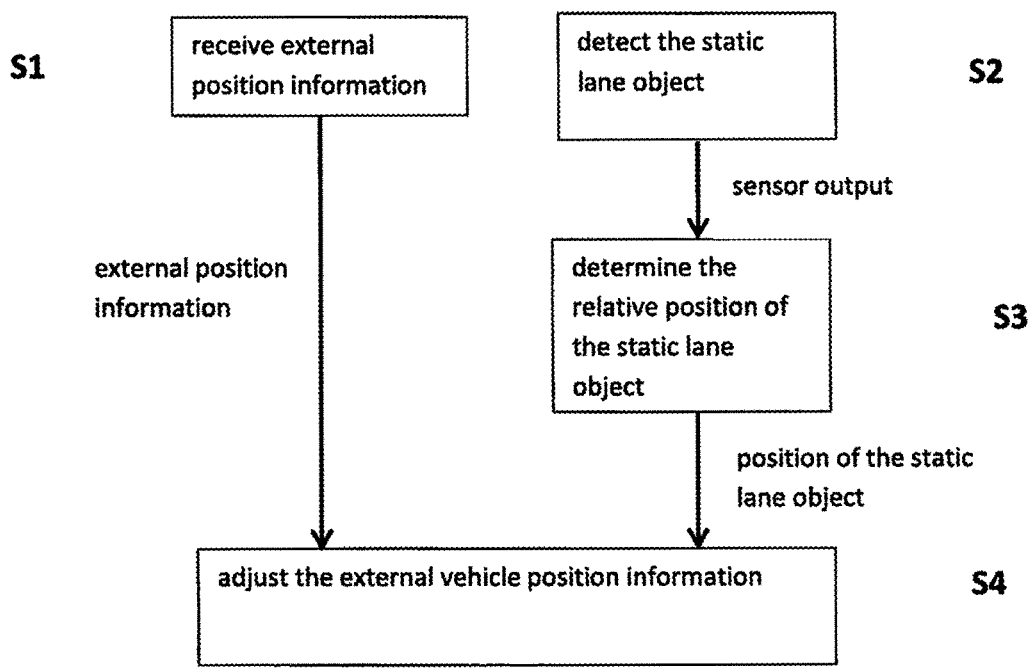
FIG. 2 shows a schematic flow chart illustrating an exemplary method of adjusting external position information of a vehicle according to embodiments of the present disclosure.

FIG. 2 shows a schematic flow chart illustrating an exemplary method of adjusting external position information of a vehicle according to embodiments of the present disclosure. The system 10 and/or the control device 1 is desirably configured to carry out said method.

In step S1 external position information indicating the vehicle position is received by the system 10, in particular the control device 1. This step may include receiving a geo position information, receive and/or store map data, and determine the vehicle position based on the geo position information and the map data. Step S1 is desirably repeatedly carried out. Accordingly, the system is able to determine its geo position based on the external position information. However, since this determined geo position is not necessarily precise, i.e. reliable, the present disclosure proposes an additional adjustment technique, as described in steps S2 to S4.

In step S2 a predetermined static lane object 50 (see FIG. 3) is detected by the system 10, in particular the control device 1. Desirably a sensor 3 has sensed the driving scene comprising the static lane object (as explained above), such that based on the sensor output (i.e. one or more images) the static lane object can be detected. In other words, it is determined whether a received image includes a predetermined static lane object 50. In case a static lane object 50 can be identified in the image, its position in the image is determined.

Step S2 is desirably repeatedly carried out, for every $n^{th}$ image received from the sensor (e.g. n=any of 1 to 10). Desirably steps S3 and S4 are only triggered, in case a static lane object 50 can be identified in an image in step S2.

In step S3 the (relative) position of the static lane object with regard to the vehicle position is determined. Desirably, based on the received sensor output, in particular based on an image including a static lane object 50, more in particular based on the determined position of an identified static lane object 50 in an image, said determination of the position of the static lane object with regard to the vehicle position is done. Furthermore, as a consequence the position of the vehicle with regard to the static lane object position may be determined. Further factors which may be considered when determining (relative) position of the static lane object with regard to the vehicle position are the vehicle speed, the motion direction of the vehicle, and the calculation time o steps S2 to S4.

Desirably, in step S3 also the geo position of the detected static lane object is determined. For example, received and/or stored map data may be used to localize the detected static lane object.

In step S4 the external vehicle position information is adjusted. This is done by calibrating the vehicle position (indicated by external position information) with regard to the determined position of the static lane object. Desirably, in step S4 also the geo position of the vehicle is calibrated (i.e. refined or corrected) with regard to the geo position of the static lane object. In other words, the determined geo position of the static lane object may be used (as a reference) to calibrate the vehicle position indicated by external position information.

Steps S2 and S3 may be carried out in parallel to step S1. The whole method of steps S1 to S4 may be repeatedly carried out.

Optionally, in parallel and in correspondence to steps S2 to S4, a road sign and/or a dedicated localization sign may be detected based on the received sensor output (correspondingly to step S2). The position of the road sign 60 (see FIG. 3) and/or the dedicated localization sign may be determined with regard to the vehicle position based on the received sensor output (correspondingly to step S3). The vehicle position information may be adjusted by additionally calibrating the vehicle position to the determined position of the road sign and/or the dedicated localization sign (correspondingly to step S4).

Some factors may deteriorate the quality of the calibration technique, e.g. a bad visibility or a specific motion of the vehicle during the detection of a static lane object, e.g. a lane change. Accordingly, a level of visibility and/or a lane change of the vehicle may be determined based on the received sensor output. The vehicle position adjustment may be applied with a weighting factor. For example weighting factor is decreased in case of a decreased level of visibility.

As another example, the weighting is decreased in case of an increased distance to the detected static lane objet. In another example, the weighting factor is decreased in case of a lane change during detection of the static lane object.

Figure 3:
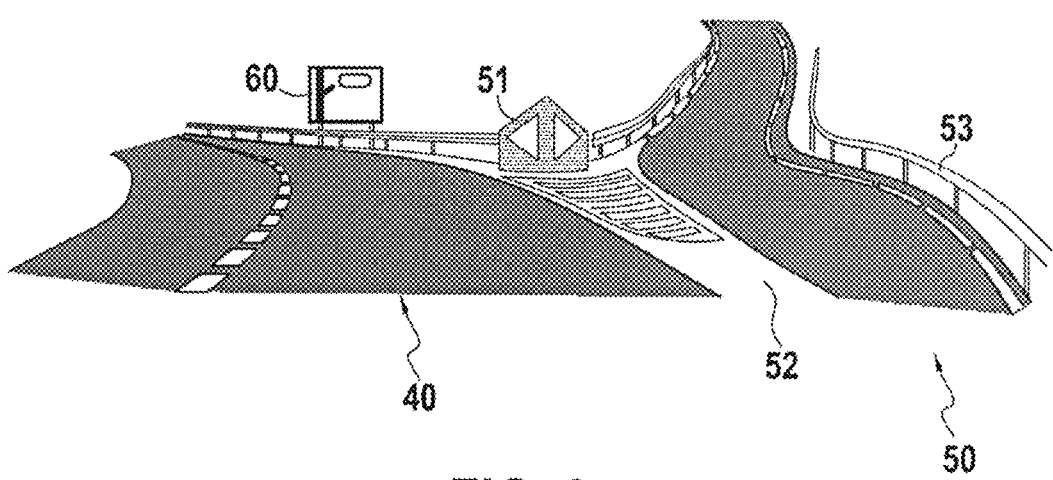
FIG. 3 shows an example of a static lane object comprising predetermined elements according to embodiments of the present disclosure.

FIG. 3 shows an example of a static lane object comprising predetermined elements according to embodiments of the present disclosure. FIG. 3 may represent a driving scene, as it is sensed by the sensor 3. FIG. 3 shows a road 40, which has in in this example at least two driving lanes. In addition, a static lane object 50 is shown, which is in this example an exit lane area. Further examples of static lane objects are: a road junction area, an joining lane area of the road a lane splitting area of the road, a lane merging area of the road, and an emergency stopping lane area of the road (shoulder). Such a static lane object may be detected and used as a reference in the above described adjustment technique. The advantage of using such a static lane objects 50 is that that they are provided in intervals (e.g. app. every 10 km) at conventional roads, e.g. high ways.

The exit lane area comprises several predetermined elements which in particular may be detected and used as a reference in the above described calibration technique. Said elements have the advantage that they have a clearly identifiable position and they are regularly placed at predetermine positions of the static lane object. Example of such elements are a safety barrier 53 (of the exit lane area 50, e.g. the vertex of the safety barrier at the point of separation of the exit lane and the road), a gore area 52 (indicating the exit lane area 50, e.g. a broadening white line or field between the exit lane and the road), and an impact attenuator 51 (e.g. a bollard or a sign indicating the point of separation of the exit lane area 50 with regard to the road 40) placed at a point of separation of the exit lane area 50 with regard to the road 40.

Desirably the impact attenuator 51 is used as a reference, as it has a clearly identifiable position due its compact size. It can also be easily detected due to its predefined (common) form and color (e.g. green). Furthermore these impact attenuators 51 are usually placed or placable at predefined positions with regard to the exit lane area, e.g. 1m in front of the safety barrier defining the separation of the exit lane from the road (i.e. the vertex of the safety barrier).

FIG. 3 further shows an example of a (conventional) road sign 60 which may additionally be used as a reference in the above described adjustment technique. However, said additional adjustment technique may also apply a weighting factor, wherein the size of the road sign is considered (e.g. the smaller the road sign, the smaller the weighting factor). In case the road is provided with dedicated localization signs (not shown in FIG. 3), their detection is prioritized for adjustment with respect to a detected static lane object and/or a road sign.

In the above described adjustment technique not necessarily every exit lane area 50 (or other static lane object) is used as a reference but only e.g. every second. Furthermore, when the adjustment technique is started, a first detected exit lane area 50 may be used to initialize the adjustment technique.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A system for adjusting external position information of a vehicle driving on a road, comprising:
a sensor configured to sense a predetermined static lane object of the road, the vehicle driving on said road, and
an electronic control device configured to:
receive external position information indicating a vehicle position,
detect the static lane object based on a sensor output received from the sensor,
determine a position of the static lane object with regard to the vehicle position based on the received sensor output,
adjust the external vehicle position information by calibrating the vehicle position with regard to the determined position of the static lane object, and
apply a weighting factor to the vehicle position adjustment based on a distance of the detected static lane object, wherein the weighting factor is decreased in case of an increased distance,
wherein the electronic control device is further configured to:
detect a road sign and/or a dedicated localization sign based on the received sensor output,
determine the position of the road sign and/or the dedicated localization sign with regard to the vehicle position based on the received sensor output, and
adjust the external vehicle position information by additionally calibrating the vehicle position with regard to the determined position of the road sign and/or the dedicated localization sign.

2. The system according to claim 1, wherein
receiving an external position information includes:
receive a geo position information,
receive and/or store map data, and
determine the vehicle position based on the geo position information and the map data.

3. The system according to claim 2, wherein
determining the position of the static lane object desirably comprises: determine the geo position of the detected static lane object in received and/or stored map data.

4. The system according to claim 3, wherein
calibrating the vehicle position comprises:
calibrate the geo position of the vehicle with regard to the geo position of the static lane object.

5. The system according to claim 1, wherein
calibrating the vehicle position comprises:
calibrate a geo position of the vehicle with regard to a geo position of the static lane object.

6. The system according to claim 1, wherein
the static lane object constitutes a predetermined change in the lane characteristics along the road.

7. The system according to claim 1, wherein
the electronic control device is configured to:
detect a predetermined element of the static lane object based on the received sensor output,
determine the position of the predetermined element with regard to the vehicle position based on the received sensor output,
adjust the vehicle position information by calibrating the vehicle position to the determined position of the predetermined element.

8. The system according to claim 7, wherein
the predetermined element comprises at least one of:
a safety barrier of the static lane object,
a gore area indicating the static lane object, and
an impact attenuator placed at a point of separation of an exit lane with regard to the road.

9. The system according to claim 1, wherein
the electronic control device is further configured to:
determine a level of visibility and/or a lane change of the vehicle based on the received sensor output,
apply a weighting factor to the vehicle position adjustment based on at least one of:
the level of visibility, wherein the weighting factor is decreased in case of a decreased level of visibility, and
a lane change during detection of the static lane object, wherein the weighting factor decreased in case of the lane change.

10. The system according to claim 1, wherein
adjusting the external vehicle position information comprises:
initialization of the electronic control device based on a first detected static lane object, and
adjusting the vehicle position information by calibrating the vehicle position to determined position of subsequently detected static lane objects.

11. The system according to claim 1, wherein
the electronic control device is configured to:
when adjusting the vehicle position information, prioritize a detected dedicated localization sign with regard to detected static lane object and/or road sign.

12. The system according to claim 1, wherein
the road extends in a longitudinal direction and/or the road width is defined by its lateral extension, wherein
adjusting the external vehicle position information comprises at least one of:
adjusting a relative lateral position information of the vehicle with respect to the road,
adjusting a relative longitudinal position information of the vehicle with respect to the road, and
adjusting a geo position information of the vehicle.

13. The system according to claim 1, wherein
the system is an automated driving system configured to autonomously drive the vehicle.

14. A transport system comprising:
a system according to claim 1, and
a calibration system for calibrating the vehicle position configured to be installed at a road comprising at least one predetermined static lane object, wherein
the at least one calibration system comprises at least one predetermined element configured to indicate the static lane object, and
the predetermined element is positioned at a predetermined position at the static lane object.

15. A method of adjusting external position information of a vehicle driving on a road, the method comprising the steps of:
sensing a predetermined static lane object of a road using a sensor, the vehicle driving on said road,
receiving external position information indicating a vehicle position, detecting the static lane object based on a sensor output received from the sensor, determining a position of the static lane object with regard to the vehicle position based on the received sensor output, adjusting the external vehicle position information by calibrating the vehicle position with regard to the determined position of the static lane object, detecting a road sign and/or a dedicated localization sign based on the received sensor output, determining the position of the road sign and/or the dedicated localization sign with regard to the vehicle position based on the received sensor output, adjusting the external vehicle position information by additionally calibrating the vehicle position with regard to the determined position of the road sign and/or the dedicated localization sign, and applying a weighting factor to the vehicle position adjustment based on a distance of the detected static lane object, wherein the weighting factor is decreased in case of an increased distance.

\* \* \* \* \*